July 31, 1956 L. LESSLER 2,756,940
MOTION PICTURE FILM MAGAZINE
Filed March 14, 1952 3 Sheets-Sheet 1

INVENTOR.
LEW LESSLER
BY James and Franklin
ATTORNEYS

July 31, 1956 L. LESSLER 2,756,940
MOTION PICTURE FILM MAGAZINE
Filed March 14, 1952 3 Sheets-Sheet 2
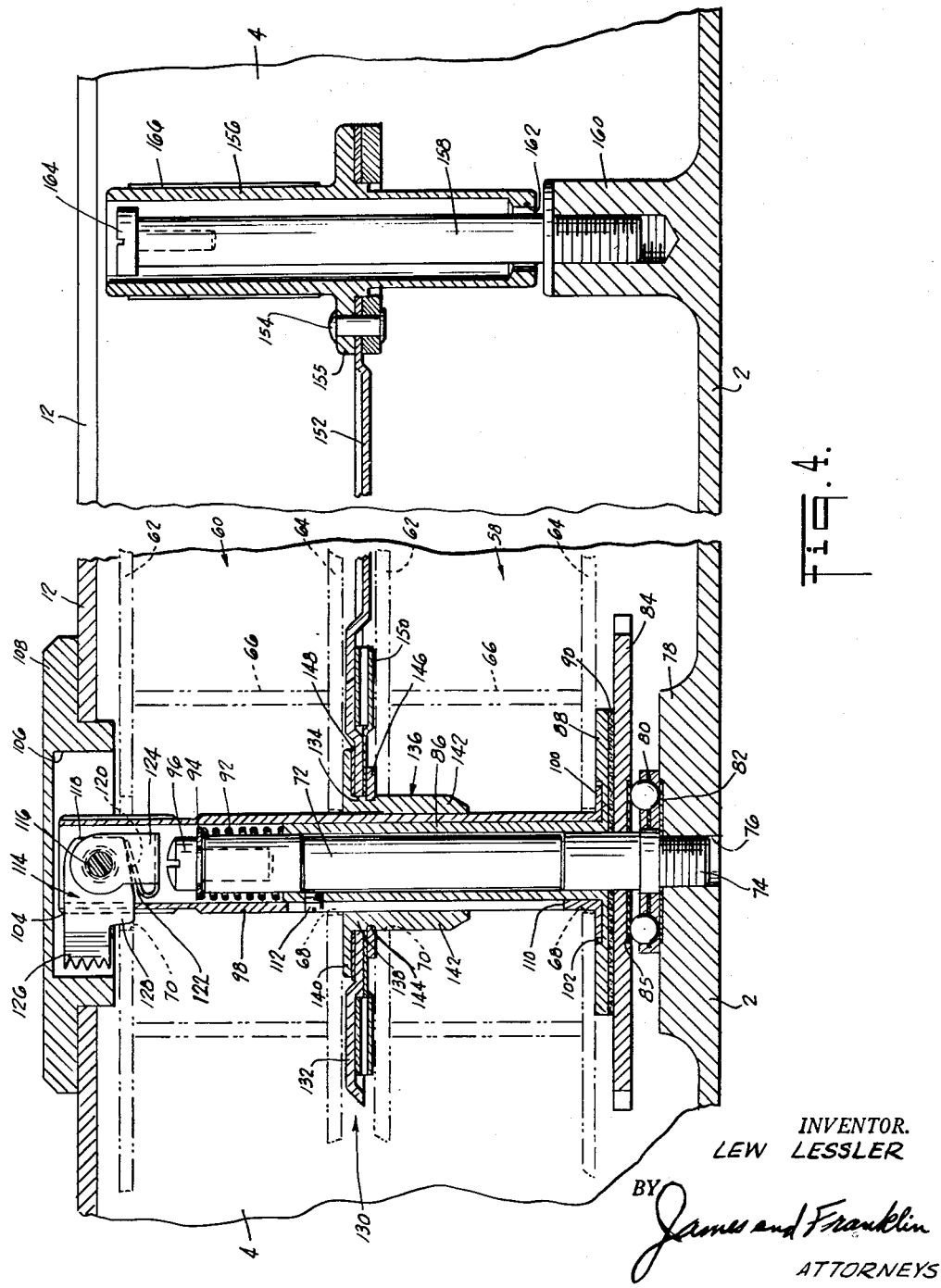
INVENTOR.
LEW LESSLER
BY
James and Franklin
ATTORNEYS July 31, 1956  L. LESSLER  2,756,940
MOTION PICTURE FILM MAGAZINE
Filed March 14, 1952  3 Sheets-Sheet 3
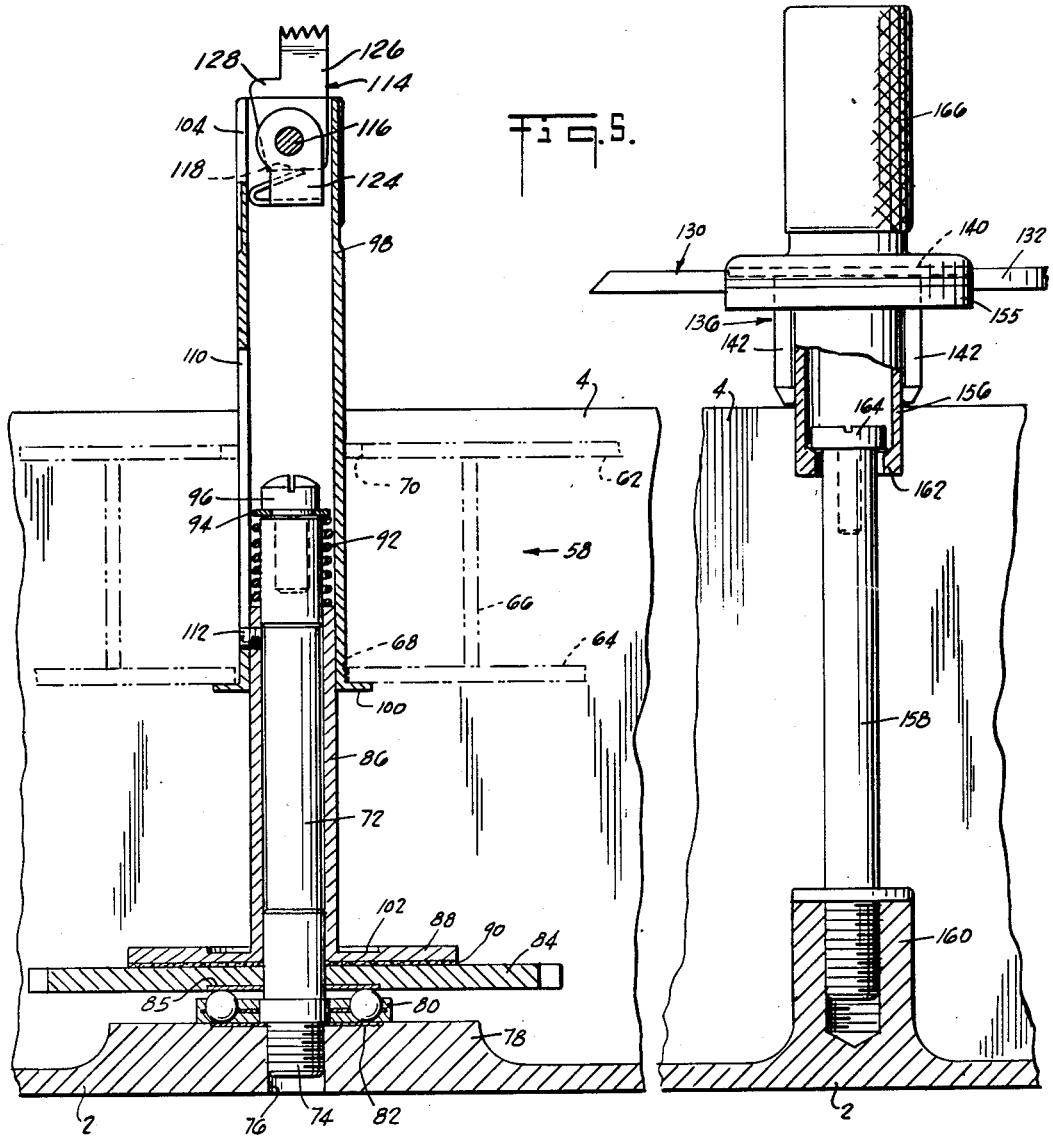
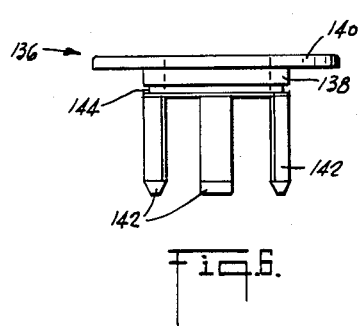
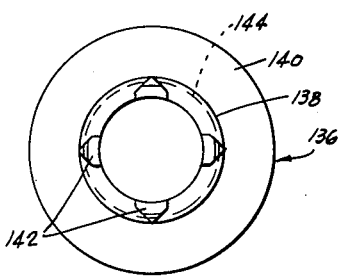
INVENTOR.
LEW LESSLER
BY James and Franklin
ATTORNEYS

United States Patent Office 2,756,940
Patented July 31, 1956

2,756,940

MOTION PICTURE FILM MAGAZINE

Lew Lessler, Binghamton, N. Y., assignor to De Jur-Amsco Corporation, Long Island City, N. Y., a corporation of New York Application March 14, 1952, Serial No. 276,591

28 Claims. (Cl. 242—71)

The present invention relates to the structure of a motion picture film magazine, and to the means therein provided for mounting a pair of reels, one to supply a length of film and the other to take up that length of film as the film is progressively exposed. In magazines adapted to contain a supply of motion picture film, means must be provided for moving the film past an exposure aperture in timed relation to the operation of the photographing apparatus of the camera itself. The supply of film is ordinarily provided on a reel, denominated the supply reel, and as the film is exposed it is wound onto another reel, denominated the takeup reel. Means are provided for rotating the takeup reel so as to wind film thereupon, that means generally including a friction relief drive portion permitting the speed of rotation of the reel to change as the film is wound thereupon in order that the film will be moved through the camera at a constant linear speed. The supply reel is ordinarily free to rotate, so that film may be unwound therefrom, again at constant linear speed, and a friction drag means is applied to the supply reel to prevent overrunning of the supply reel when the camera is stopped. In addition, a separate driving means is provided to move the film past the exposure aperture, normally taking the form of one or more sprocket wheels adapted to engage the film between the takeup and supply reels and positively move it at a fixed speed corresponding to the speed at which the film is to be moved past the exposure aperture.

The present invention relates to a general arrangement of parts within the magazine so that the space within the magazine can be most efficiently used, and more particularly so that reels of maximum size may be positioned within the magazine, thus providing for as great a supply of film in a given magazine as is practical. As will be understood, the greater the supply of film within a given magazine, the less frequently will it be necessary to change magazines, and consequently the taking of pictures will be less liable to interruption.

To this end, the magazine is so devised that the two reels are mounted coaxially, one above the other, the thickness of the magazine thus corresponding roughly to twice the thickness of each reel and the longitudinal and lateral dimensions of the magazine being only slightly greater in overall extent than the longitudinal dimensions of the reels themselves. In this way the size of the magazine is minimized relative to the size of the film reels, or, stated conversely, the size of the film reels, and hence the film capacity of the film reels, is maximized with respect to the magazine dimensions.

In order to ensure that the film is properly moved past the exposure aperture in the magazine, a pair of sprocket wheels are employed, those wheels being mounted coaxially one above the other and each on a level with one of the reels, the sprocket wheels being rotated simultaneously and the film being wound from the supply reel over a sprocket wheel in line therewith, past the exposure aperture, over the other sprocket wheel, and then to the takeup reel in line therewith. The sprocket wheels are preferably positioned between the supply and takeup reels, on the one hand, and the exposure aperture in a wall of the magazine on the other hand, the film forming two loops in the course of its travel so that it can be moved past the exposure aperture in intermittent fashion, as is conventional, although the sprocket wheels and the takeup reel are constantly driven in rotation.

As has been previously mentioned, means must be provided for rotating the takeup reel, while the supply reel must be free to rotate, although preferably with a friction drag applied thereto. In mounting the two reels coaxially certain problems are presented in effectively achieving the necessary mode of rotation-control for each reel. The present invention avoids these difficulties by providing a specific type of mounting and driving arrangement for the reels, by means of which the proper drive or drag, as the case may be, is provided for each reel.

Another problem involved in the mounting of reels within a magazine of this type is to ensure that the reels are properly positioned, so that when the film is threaded through the magazine its emulsioned side is outwardly presented as it moves past the exposure aperture. Each of the reels is customarily provided with a central aperture the opposite ends of which are differently shaped, one end usually being circular and the other end usually being square or having some other non-circular shape so as to be engageable by appropriate parts of the driving mechanism. The driving mechanism is preferably so correlated with the shaping of the ends of the central apertures of the reels as to provide a fool-proof indication of when the reels are properly positioned. The mounting and driving mechanism here disclosed affords just such an indication. This is accomplished by utilizing separate reel-engaging means for the supply reel and the takeup reel, each of those reel-engaging means being operatively connectable only with the non-circular one of the central reel apertures, the reel-engaging members being so positioned and mounted as to insure that only when the reels are properly positioned will they be operatively connected respectively with the appropriate reels. If correct connection between reels and reel-engaging members is not made, or if the reels are improperly positioned in the magazine, this will be positively indicated to the assembler, since the magazine will not be closable should that occur.

When reels are coaxially mounted within a magazine, one above the other, and when, as here, efforts are made to maximize the size of the reels with respect to the internal dimensions of the magazine, some difficulty may be experienced in removing the reels from the magazine when the film is to be changed. The mounting and driving mechanism, as here disclosed, is so constructed as to facilitate access to the reels on such an occasion, this being accomplished by forming the mounting mechanism so that it may itself constitute lifting means for the reels, thus permitting them to be moved toward a position of ready access when they are to be removed from the magazine.

To the accomplishment of the above, and to such other objects as may hereinafter appear, the present invention relates to a motion picture film magazine construction and to the construction of the mounting, supporting and driving means for the supply and takeup reels, as defined in the appended claims and as described in this specification, taken together with the accompanying drawings, in which:

Fig. 4 is a cross sectional view, partially broken away in length, taken along the line 4—4 of Fig. 1;

Fig. 5 is a view similar to Fig. 4 but showing the position which the parts assume during one stage in the removal of the reels from the magazine;

Fig. 6 is a front elevational view of the reel-grasping element carried by the partition member and adapted to engage the supply reel; and Fig. 7 is a bottom plan view of the reel-grasping element of Fig. 6.

Figure 1:
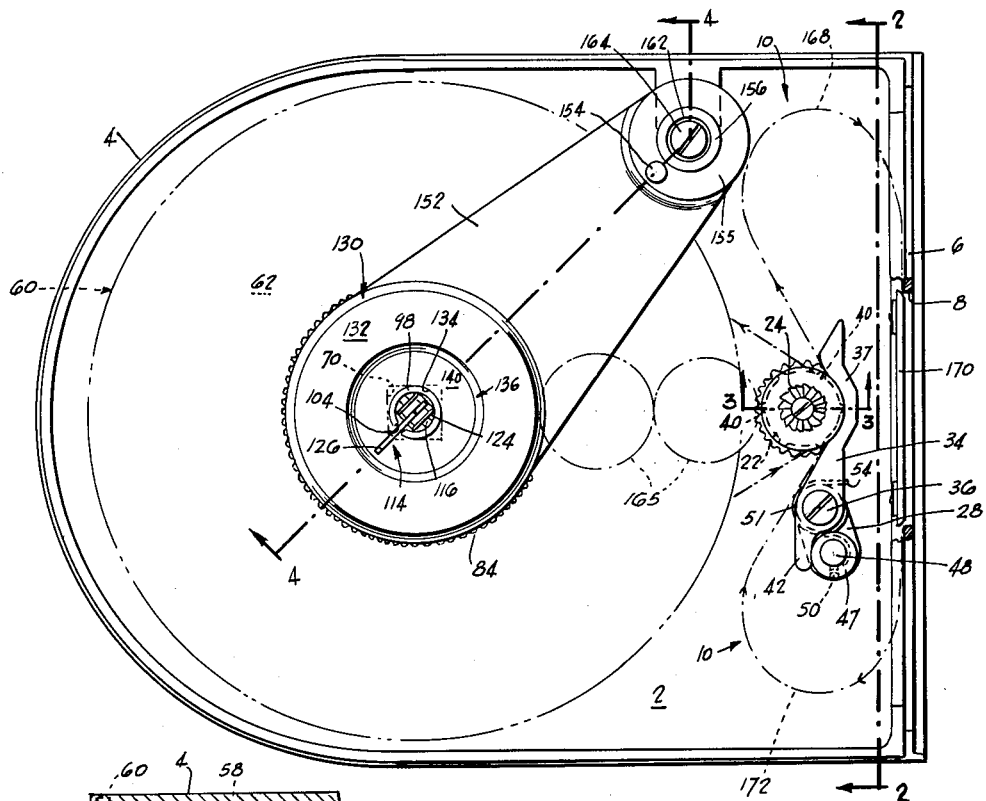
Fig. 1 is a top plan view of the magazine of the present invention, with the top wall being removed therefrom and with the film path being indicated by broken lines.
Figure 2:
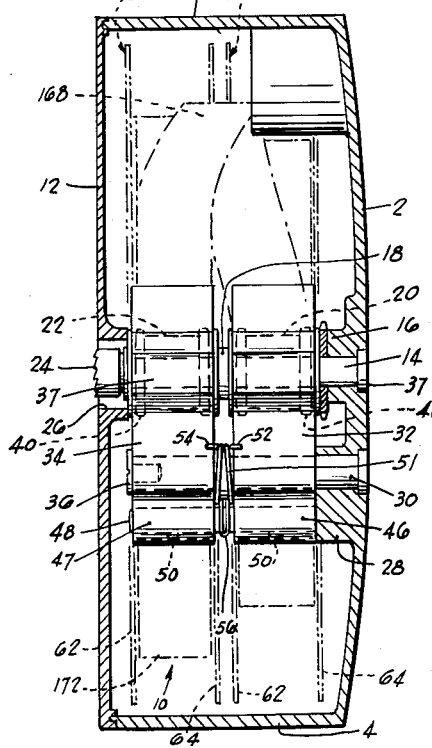
Fig. 2 is an end cross sectional view thereof, taken along the line 2—2 of Fig. 1, the path of the film and the location of the reels being indicated by broken lines.

The magazine casing comprises a bottom wall 2, a generally U-shaped side wall 4, and a front wall 6 having an aperture 8 therein past which the film, generally designated 10 and indicated by broken lines, is adapted to pass. The casing as thus defined is open at its top, and a top wall 12 is provided which normally is secured in place to close the top of the magazine, but which may be removed therefrom when it is desired to remove or replace reels or otherwise to adjust the film contained within the magazine.

Figure 3:
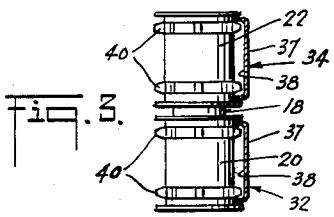
Fig. 3 is a detail cross sectional view taken along the line 3—3 of Fig. 1.

A stud 14 is mounted in boss 16 rising from the bottom magazine wall 2, the stud 14 being here shown as positioned directly in front of the exposure aperture 8 in the front wall 6 of the magazine. Sleeve 18 is rotatably mounted on the stud 14 and carries a pair of sprocket wheels 20 and 22 rigidly affixed thereto, a gear 24 having an inclined outer gear face being mounted at the upper end of the sleeve 18 so as to project outwardly through aperture 26 in the magazine top wall 12, thus being adapted to be engaged by a mating driving gear in the camera with which the magazine is to be used. A second boss 28 extends upwardly from the bottom magazine wall 2 at a point spaced but a short distance from the boss 16. A stud 30 is mounted in and extends upwardly from the boss 28, and a pair of levers 32 and 34 are pivotally mounted on the stud 30, being secured in place by means of the screw 36. The ends 37 of the levers 32 and 34 extend over each of the sprocket wheels 20 or 22 as the case may be, these ends 37 being channelled as at 38 (see Fig. 3) so as to engage the sprocket wheels 20 and 22 above and below the sprocket teeth 40 thereon, the lever ends 37 thus serving as guards to ensure that the film 10, when once passed over the sprocket wheels 20 and 22, will remain in proper engagement therewith. The opposite ends 42 of the levers 32 and 34 extending to the other side of the stud 30 which defines the pivotal axis for said levers engage eccentric cam sleeves 46 and 47 which are mounted on stud 48 also extending upwardly from the boss 28. The eccentric sleeves 46 and 47 are fixed to the stud 48 by means of set screws 50, and the stud 48 is rotatable so that the eccentric cam sleeves 46 and 47 can thereby be rotated to pivot the levers 32 and 34 so that their ends 37 approach or move away from the sprocket wheels 20 and 22. A spring 51 is wrapped around the stud 30, the extremities 52 and 54 of the spring 51 engaging the outer surfaces of the levers 32 and 34 respectively, the central portion of the spring 51 being reversely bent as at 56 and engaging the stud 48 between the sleeves 46 and 47, the spring 51 thus serving to bias the ends 37 of the arms 32 and 34 against the sprocket wheels 20 and 22.

The supply reel 58 and the takeup reel 60 may be identical in construction and may take any conventional form. As here disclosed for purposes of illustration (see Figs. 4 and 5), each of these reels 58 and 60 consists of top and bottom plates 62 and 64 connected by a central cylindrical hub 66 around which the film is adapted to be wound. The hub 66 is hollow, and the top and bottom plates are provided with registering apertures, one of which, designated 68, is circular, and the other of which, designated 70, is non-circular and, as here specifically disclosed, is square in shape. As is well-known, the reason for making the apertures 68 and 70 of different shapes is to ensure that the reels are placed in the magazine in proper position and to provide some means by which the reel-engaging mechanism can grasp those reels.

The mounting and motion-controlling structure for use with the reels 58 and 60 is best shown in Figs. 4 and 5. It comprises a stud 72 the lower end 74 of which is threadedly received within aperture 76 in boss 78 rising from the bottom magazine wall 2. The lower end of the stud 72 has an anti-friction bearing 80 mounted thereon, that bearing resting on a bearing plate 82 inset in the boss 78. The gear 84 is freely rotatably mounted on the stud 72 above the bearing 80, that gear having a bearing plate 85 inset in its lower surface. An inner rotating member is mounted on the stud 72 so as to be rotatable thereabout, this inner rotating member comprising a sleeve 86 and a lower outwardly projecting rim flange 88 on which the lower wall 64 of the supply reel 58 is adapted to rest. A friction pad 90 is interposed between the flange 88 and the gear 84, the inner rotating member being urged downwardly into frictional engagement with the friction pad 90 and, through that pad, into driving engagement with the gear 84, by means of a spring 92 the lower end of which bears against the upper edge of the sleeve 86 and the upper end of which is pressed downwardly by means of washer 94 secured to the tip of the stud 72 by means of screw 96.

Comparatively loosely mounted on the inner rotating member is an outer rotating member defined by the sleeve 98 having at its lower end an outwardly projecting rim flange 100 which is adapted to seat in a correspondingly shaped depression 102 in the upper surface of the flange 88 of the inner rotating member. The sleeve 98 projects above the stud 72 and is provided at its upper end with a slot 104. The height of the stud 72 is such that it does not extend all the way to the top magazine wall 12, while the sleeve 98, when its flange 100 is received within the recess 102, will extend up to the top wall 12 and, as here specifically shown (see Fig. 4), will extend into a recess 106 formed in a cap 108 which forms a part of the top wall 12 and projects upwardly therefrom to a slight degree. The sleeve 98 is provided with an elongated slot 110 oriented in the direction of its length, and a pin 112 carried by the inner sleeve 86 is slidable within the slot 110. By means of the pin and slot interconnection 112, 110, rotation of the inner sleeve 86 is transmitted to the outer sleeve 98 so that the two sleeves will rotate together. By reason of the elongated nature of the slot 110, the outer rotating member, and more particularly the sleeve 98, can be slid longitudinally with respect to the axis of rotation of the two sleeves 86 and 96 whenever the magazine top plate 12 is removed.

Mounted within the sleeve 98 at its upper extremity is a reel-engaging member 114 in the form of a plate pivotally mounted on screw 116 and having a pair of flattened surfaces 118 and 120 adapted to be engaged by spring 122 mounted in bracket 124 through which the screw 116 extends, said screw 116 serving to fix the bracket 124 and the reel-engaging member 114 to the sleeve 98 for movement therewith. The flat surfaces 118 and 120 are so positioned that the spring 122 will tend to retain the reel-grasping member 114 either in its operative position shown in Figs. 1 and 4, in which it is oriented substantially at right angles to the longitudinal axis of the sleeve 98, or in its inoperative position, as illustrated in Fig. 5, in which it is substantially parallel to the longitudinal axis of the sleeve 98 and is completely enclosed within the periphery of that sleeve. The reel-grasping member 114 includes a serrated finger-engageable portion 126 and a tooth-like portion 128. When the member 114 is in its operative position, the finger-engaging portion and the tooth 128 extend laterally through the slot 104 at the upper end of the sleeve 98, the tooth 128 engaging in a corner of the square-shaped aperture 70 in the top wall 62 of the takeup reel 60. When the member 114 is in its inoperative position, the finger engageable portion 126 will extend upwardly above the sleeve 98 but all portions of the member 114 will be included within the internal dimensions of the sleeve 98.

The internal dimensions of the apertures 68 and 70 in the walls 64 and 62 of the reels 58 and 60 is but slightly larger than the external diameter of the sleeve 98, and consequently the reels 58 and 60 may be freely slid onto and off of the sleeve 98 when the cover 12 of the magazine has been removed. However, the flange 100 at the lower end of the sleeve 98 extends outwardly for a distance such that the lower wall 64 of the lowermost reel will rest thereon, and consequently when the sleeve 98 is slid upwardly along the inner sleeve 86, thus lifting the flange 100 along therewith, the lowermost or supply reel 58 will also be lifted.

A partition member generally designated 130 is interposed between the supply reel 58 and the takeup reel 60. That partition member comprises a plate 132 having a central aperture 134 and adapted to be received over the outer sleeve 98. The apertured portion of the plate 132 carries a reel-grasping element generally designated 136 and best shown in Figs. 6 and 7, that element comprising an annular head 138 with an upper and outwardly extending flange 140 and with a group of downwardly extending fingers 142, here shown as four in number, adapted to enter the corners or other non-circular portions of the aperture 70 in the upper wall 62 of the supply reel 58. The head 138 is provided with a peripheral groove 144 into which a washer 146 is receivable. The partition plate 132 carries on its upper surface a friction pad 148 positioned directly under the flange 140 of the reel-grasping element 138, and a spring 150 is carried by the partition plate 132 on its underside so as to be engageable with the washer 146 secured within the recess 144 in the reel-grasping element 138, thus pressing that element downwardly so that its flange 140 is moved firmly into frictional engagement with the friction pad 148.

The partition plate 132 is mounted on the end of arm 152 which extends outwardly beyond the periphery of the supply and takeup reels 58 and 60, where it is secured by means of rivet 154 to a flange 155 on sleeve 156 which is mounted on stud 158 secured to boss 160 extending upwardly from the bottom magazine wall 2. The lower end of the sleeve 156 is provided with an inbent flange 162, and a screw having a wide head 164 is removably receivable in the upper end of the stud 158. The sleeve 156 is rotatable about the stud 158 and is liftable therealong, the outer surface of the upper portion of the sleeve 156 being knurled, as at 166, to facilitate manual manipulation thereof. The screw head 164 is wider than the internal dimension of the flange 162, the screw head 164 thus serving as a positive stop limiting the degree to which the sleeve 156 can be raised (see Fig. 5). The relative dimensions of the parts are such that the sleeve 156 can be raised until the arm 152, and the partition member 130 carried thereby, is lifted above the top of the magazine, this being possible, of course, only after the magazine cover 12 has been removed. Thereafter, the sleeve 156 can be pivoted about the stud 158 to a position shown in Fig. 5, the arm 152 then extending over the upper edge of a side wall 4 of the magazine and being restable thereon, out of the way, while subsequent manipulation of reels takes place.

The manner of use of the magazine of the present invention will now be described, starting with the magazine empty, with the top cover 12 removed therefrom, and with the partition member 130 swung upwardly and out of the way, in its position shown in Fig. 5. The supply reel 58, on which the unexposed film is wound, is first inserted into the magazine by being slid over the outer sleeve 98 with the top wall 62 thereof uppermost. This reel slides downwardly until its lower wall 64 rests on the flange 88 secured to the inner sleeve 86 and on the flange 100 secured to the outer sleeve 98. The knurled portion 166 of the sleeve 156 is then grasped and rotated until the partition member 130 is positioned over the outer sleeve 98, with the central aperture of the reel-grasping element 136 in line therewith, and then the sleeve 156 is pushed downwardly over the stud 158, thus causing the partition member 130 to move downwardly over the outer sleeve 98 until the fingers 142 depending from the reel grasping element 136 enter the corners of the square-shaped aperture 70 in the upper wall 62 of the supply reel 58. If the supply reel 58 has been inserted upside down, this will be indicated by the fact that the fingers 142 will not be able to enter the circular aperture 68 of that bottom wall 64, which would then be uppermost, and consequently the assembler will be immediately apprised of the fact that the supply reel is not properly arranged within the magazine.

After the partition member 130 has been properly positioned, with its fingers 142 received within the corners of the square aperture 70 in the top wall 62 of the supply reel 58, the takeup reel 60, which is empty, will be placed in position by sliding it over the upper portion of the outer sleeve 98 until it rests on top of the partition member 130.

During these operations the reel-engaging member 114 is in its inoperative position, thus not interfering in any way with the sliding of the reels 58 and 60 over the outer sleeve 98. After the takeup reel 60 has been placed in position, the reel-engaging member 114 is swung to its operative position as shown in Fig. 4, its tooth 128 fitting within a corner of the square-shaped aperture 70 in the top wall 62 of the takeup reel 60. If the takeup reel 60 has been placed into the magazine in an upside down position, there will be no place for the tooth 128 to go, since it will not pass within the round aperture 68 in the bottom wall 64 of the spool 60, and thus the assembler will again be immediately apprised of the fact that the reel 60 is upside down.

The film 10 is then threaded through the film-driving mechanism, it being led off from the supply reel 58, passed around the outside of the lowermost sprocket wheel 20 so that the teeth 40 thereof engage within the sprocket holes inside of the film, then looped as indicated at 168, that loop moving upwardly within the magazine toward the top thereof, the film then passing along the front wall 6 and across the exposure aperture 8 therein, the pressure plate 170 of any conventional design being provided to ensure proper registration between the film 10 and the exposure aperture 8 as the film passes thereacross. The film is then formed into a loop 172 and is passed back into engagement with and over the outer portion of the upper sprocket wheel 22, the sprocket teeth 40 thereof engaging with the sprocket holes in the side of the film. Thereafter the film is led to the takeup reel 60. While this threading operation is taking place the stud 48 is rotated so that the outwardly radially disposed portions of the eccentric sleeves 46 engage the ends 42 of the levers 32 and 34 respectively, thus camming the ends 37 of those levers away from the sprocket wheels 20 and 22 so as to permit ready threading. After the threading operation has been completed, the stud 48 is rotated to its position shown in Fig. 1, the spring 51 causing the levers 32 and 34 to pivot in a counter-clockwise direction as viewed in Fig. 1 so as to engage the film 10 as it passes over the sprocket wheels 20 and 22 and retain the film in driven engagement therewith.

The magazine is now ready for use, and the top cover plate 12 is placed in position thereon. When the magazine is inserted into the camera with which it is to be used, a driving connection is made between the camera motor and the gear 24 which rotates the sprocket wheels 20 and 22. Any suitable driving connection, such as a conventional chain of gears 165, may be operatively interposed between the gear 24 which controls the rotation of the sprocket wheels 20 and 22 and the gear 84 which forms a part of the reel-driving mechanism. As the sprocket wheels 20 and 22 are rotated, therefore, the gear 84 will also be rotated. Rotation of the gear 84 will be transmitted via the friction pad 90, flange 88, sleeve 86, pin 112, and slot 110, to the outer sleeve 98 and the reel-engaging member 114 carried at the upper portion thereof, the tooth 128 of the reel-engaging member 114 causing the takeup reel 60 to rotate, the speed of rotation of that takeup reel being automatically controlled and regulated in accordance with the amount of film wound thereupon by means of the friction pad 90. During this time the supply reel 58 must rotate, and it can do so, but a friction drag is applied thereto via the reel-grasping member 136 which is frictionally urged against the friction pad 148 by means of spring 150 and wire 146.

Thus, from a single external driving source, the film is positively moved past the exposure aperture 8 in a uniform manner, the takeup reel 60 is driven so as to wind film thereupon, and the supply reel 58 is permitted to unwind while a friction drag is applied thereto. If either of the reels 58 or 60 is improperly positioned within the magazine, that fact will be indicated to the assembler during the process of the assembly and hence can be corrected before the magazine is shipped out for use.

When the film in the magazine has been completely exposed and the magazine has been returned to the photographic laboratories for processing of that film, removal of the reels 58 and 60 from the magazine may present somewhat of a problem, particularly in view of the fact that the size of the reels, as indicated in Fig. 1, is quite closely comparable to the internal dimensions of the magazine itself. However, by reason of the reel mounting structure here disclosed, removal of the reels from the magazine is facilitated. After the top cover 12 has been removed and the stud 48 has been rotated to remove the levers 32 and 34 from the sprocket wheels 20 and 22 in the event that film still passes over those sprocket wheels, the film is wound completely onto the takeup reel 60. The member 114 is pivoted to its inoperative position, and the knurled portion 166 of the sleeve 156 is grasped and lifted, thus lifting the partition member 130 and consequently the takeup reel 60 which rests thereupon. Thus removal of the takeup reel 60 is effected without having to reach into the magazine itself. After the takeup reel has been removed and partition member 130 has been swung to an out-of-the way position through rotation of the sleeve 156 on the stud 158, as shown in Fig. 5, the outer sleeve 98 is grasped and lifted along the inner sleeve 86, its flange 100 engaging the under surface of the lower wall 64 of the supply reel 58 and lifting that up to the open top of the magazine, thus permitting ready access to that reel 60 so that it can be easily removed from the magazine. The outer sleeve 98 is then released, and it will fall by its own weight to its position shown in Fig. 4 ready for the insertion of another and full supply reel 58.

By mounting the takeup and supply reels 58 and 60 concentrically, one above the other, use of the space within the magazine is accomplished with maximum efficiency. By utilizing a pair of sprocket wheels 20 and 22, each in line with one of the reels 58 and 60, the film 10 being led from a reel to a sprocket wheel and looped so as to pass across the exposure aperture 8, then looped again, drawn past the second sprocket wheel and guided to the other reel, free and easy passage of the film through the magazine for photographic purposes is accomplished. By utilizing the disclosed means for mounting and driving the reels, the takeup reel 60 is rotated at a speed commensurate with the amount of film wound thereupon, the supply reel 58 is permitted to rotate at a speed commensurate with the amount of film remaining thereupon, and a friction drag is applied to the supply reel 58 so as to prevent overrunning. The mounting arrangement is such that the reels cannot accidentally be put in upside down, since failure to put the reels in their proper orientation will be readily evident to the assembler and will prevent the top cover 12 from being put on. In addition, the mounting mechanism here disclosed facilitates loading and unloading of the magazine by bringing each of the reels, when they are to be removed, either above or close to the top of the magazine where they can readily be grasped.

While but a single embodiment of the present invention has been here disclosed, it will be apparent that many variations may be made therein, all within the spirit of the invention as defined in the appended claims.

I claim:

1. A film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, said partition member having an aperture through which said first shaft is passable, said partition member being mounted on an arm extending beyond the periphery of said reels, said arm being mounted on an axis member parallel to said first shaft and positioned beyond the peripheries of said reels so as to be slidable therealong, thus being movable along and off an end of said first shaft, and so as to be rotatable thereabout, thus being swingable to one side to expose said first shaft.

2. A film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, said partition member having an aperture through which said first shaft is passable, said partition member being mounted on an arm extending beyond the periphery of said reels and terminating in a sleeve having an inbent lower edge, an axis member parallel to said first shaft and mounted in said casing beyond the periphery of said reels, said sleeve being loosely received over said axis member so as to be slidable therealong, thus being movable along and off an end of said first shaft, and so as to be rotatable thereabout, thus being swingable to one side to expose said shaft, and a stop element on said axis member and engageable with said inbent lower sleeve edge when said sleeve is lifted, thus acting as a positive stop to prevent said sleeve from being withdrawn completely from said axis member.

3. In a film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, said partition member having an aperture through which said first shaft is passable, a reel-grasping element frictionally carried by and projecting from said partition member in the direction of said supply reel, said partition member being mounted on an arm extending beyond the peripheries of said reels, said arm being mounted on an axis member parallel to said first shaft and positioned beyond the peripheries of said reels so as to be slidable therealong, thus being movable along and off an end of said first shaft, and so as to be rotatable thereabout, thus being swingable to one side to expose said first shaft.

4. In a film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, said partition member having an aperture through which said first shaft is passable, a reel-grasping element frictionally carried by said partition member at the apertured portion thereof and comprising an annular head engageable with said partition member and fingers projecting from said head toward said supply reel for grasping the latter, said head and fingers being fittable over said first shaft, said partition member being mounted on an arm extending beyond the periphery of said reels and terminating in a sleeve having an inbent lower edge, an axis member parallel to said first shaft mounted in said casing beyond the periphery of said reels, said sleeve being loosely received over said axis member so as to be slidable thereover, thus being movable along and off an end of said first shaft, and so as to be rotatable thereabout, thus being swingable to one side to expose said first shaft, and a stop element on said axis member and engageable with said inbent lower sleeve edge when said sleeve is lifted, thus acting as a positive stop to prevent said sleeve from being withdrawn completely from said axis member.

5. A film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, said first shaft comprising an inner rotating member, a sleeve received thereover and having a slot therein parallel to its axis, a pin secured to said inner rotating member and passing through said slot, said sleeve thus being rotatable with said inner member and slidable therealong, said sleeve extending along said inner member into the central aperture of the uppermost reel for a substantial distance and being substantially freely rotatably received therewithin and a laterally projecting lip at the lower end of said sleeve extending beyond the central aperture of said lowermost reel, whereby lifting of said sleeve along said inner member will lift the lowermost reel.

6. A film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, said first shaft comprising a fixed stud, an inner rotating member rotatably received over said stud and comprising a sleeve receivable over said stud and a lower reel-supporting flange having a depression in the upper surface thereof, said stud extending above said inner member sleeve, an anti-friction bearing at the lower end of said stud, a spring active between the upper end of said stud and said inner member sleeve so as to urge said inner member toward said bearing, an outer rotating member comprising a second sleeve having a longitudinal slot therein receivable over the sleeve of said inner rotating member and having a laterally projecting lip at the lower end thereof extending beyond the central aperture of said lowermost reel, said lip being receivable in said depression in the flange of said inner rotating member, and a pin carried by said inner rotating member and receivable within said slot in said outer rotating member, whereby said members are simultaneously rotated, said outer member is slidable along said inner member, and lifting of said outer member along said inner member will lift the lowermost reel.

7. In a film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, a partition member fittable over said first shaft and adapted to be inserted between said supply reel and said takeup reel, said partition member having an aperture through which said first shaft is passable, a reel-grasping element frictionally carried and projecting from said partition member in the direction of said supply reel, said first shaft comprising an inner rotating member, a sleeve received thereover and having a slot therein parallel to its axis, a pin secured to said inner rotating member and passing through said slot, said sleeve thus being rotatable with said inner member and slidable therealong, and a laterally projecting lip at the lower end of said sleeve extending beyond the central aperture of said lowermost reel, whereby lifting of said sleeve along said inner member will lift the lowermost reel.

8. In a film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, a partition member fittable over said first shaft and adapted to be inserted between said supply reel and said takeup reel, said partition member having an aperture through which said first shaft is passable, said partition member being mounted on an arm extending beyond the periphery of said reel, said arm being mounted on an axis member parallel to said first shaft and positioned beyond the peripheries of said reels so as to be slidable therealong, thus being movable along and off and end of said first shaft, and so as to be rotatable thereabout, thus being swingable to one side to expose said first shaft, said first shaft comprising an inner rotating member, a sleeve received thereover and having a slot therein parallel to its axis, a pin secured to said inner rotating member and passing through said slot, said sleeve thus being rotatable with said inner member and slidable therealong, and a laterally projecting lip at the lower end of said sleeve extending beyond the central aperture of said lowermost reel, whereby lifting of said sleeve along said inner member will lift the lowermost reel.

9. In a film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, a partition member fittable over said first shaft and adapted to be inserted between said supply reel and said takeup reel, said partition member having an aperture through which said first shaft is passable, a reel-grasping element frictionally carried by said partition member at the apertured portion thereof and comprising an annular head engageable with said partition member and fingers projecting from said head toward said supply reel for grasping the latter, said head and fingers being fittable over said first shaft, said first shaft comprising a fixed stud, an inner rotating member rotatably received over said stud and comprising a sleeve receivable over said stud and a lower reel-supporting flange having a depression on the upper surface thereof, said stud extending above said inner member sleeve, an anti-friction bearing at the lower end of said stud, a spring active between the upper end of said stud and said inner member sleeve so as to urge said inner member toward said bearing, an outer rotating member comprising a second sleeve having a longitudinal slot therein receivable over the sleeve of said inner rotating member and having a laterally projecting lip at the lower end thereof, said lip extending beyond the central aperture of said lowermost reel and being received in said depression in the flange of said inner rotating member, and a pin carried by said inner rotating member and receivable within said slot in said outer rotating member, whereby said members are simultaneously rotated, said outer member is slidable along said inner member, and lifting of said outer member along said inner member will lift the lowermost reel.

10. In a film magazine comprising a casing, a first shaft on which both a supply reel and a takeup reel are coaxially mounted, said reels having central apertures through which said first shaft is passable, means in said magazine for engaging and moving the film as it passes between said reels, a partition member fittable over said first shaft and adapted to be inserted between said supply reel and the said takeup reel, a partition member fittable over said first shaft and adapted to be inserted between said supply reel and said takeup reel, said partition member having an aperture through which said first shaft is passable, said partition member being mounted on an arm extending beyond the periphery of said reels and terminating in a sleeve having an inbent lower edge, an axis member parallel to said first shaft mounted in said casing beyond the periphery of said reels, said sleeve being loosely received over said axis member so as to be slidable therealong, thus being movable along and off an end of said first shaft, and so as to be rotatable thereabout, thus being swingable to one side to expose said first shaft, and a stop element on said axis member and engageable with said inbent lower sleeve edge, thus acting as a positive stop to prevent said sleeve from being withdrawn completely from said axis member, said first shaft comprising a fixed stud, an inner rotating member rotatably received over said stud and comprising a sleeve receivable over said stud and a lower reel-supporting flange having a depression on the upper surface thereof, said stud extending above said inner member sleeve, an anti-friction bearing at the lower end of said stud, a spring active between the upper end of said stud and said inner member sleeve so as to urge said inner member toward said bearing, an outer rotating member comprising a second sleeve having a longitudinal slot therein receivable over the sleeve of said inner rotating member and having a laterally projecting lip at the lower end thereof and extending beyond the central aperture of said lowermost reel, said lip being receivable in said depression in the flange of said inner rotating member, and a pin carried by said inner rotating member and receivable within said slot in said outer rotating member, whereby said members are simultaneously rotated, said outer member is slidable along said inner member, and lifting of said outer member along said inner member will lift the lowermost reel.

11. In a film magazine, mounting means for a reel having a central aperture comprising an inner rotating member, a sleeve received thereover and having a slot therein parallel to its axis, a pin secured to said inner rotating member and passing through said slot, said sleeve thus being rotatable with said inner member and slidable therealong, and a laterally projecting lip at the lower end of said sleeve extending beyond the central aperture of said reel, the central aperture of said reel fitting over said sleeve, whereby lifting of said sleeve along said inner member will lift said reel, and in combination therewith a partition member fittable over said sleeve and adapted to be inserted between two reels coaxially mounted on said means, said partition member having an aperture through which said sleeve is passable, a friction element carried by said partition member, a reel-grasping element carried by and projecting from said partition member in the direction of one of said reels, and means for causing frictional engagement between said elements.

12. In a film magazine, mounting means for a supply reel and a takeup reel each having a central aperture comprising a fixed stud, an inner rotating member rotatably received over said stud and comprising a lower reel-supporting flange having a depression on the upper surface thereof and a sleeve receivable over said stud, said stud extending above said inner member sleeve, an anti-friction bearing at the lower end of said stud, a spring active between the upper end of said stud and said inner member sleeve so as to urge said inner member into engagement with said bearing, an outer rotating member comprising a second sleeve having a longitudinal slot therein receivable over the sleeve of said inner rotating member and a laterally projecting lip at the lower end thereof extending beyond the central aperture of said lowermost reel, said lip being receivable in said depression in the flange of said inner rotating member, and a pin carried by said inner rotating member and receivable within said slot in said outer rotating member, whereby said members are simultaneously rotated, said outer member is slidable along said inner member, and lifting of said outer member along said inner member will lift the lowermost reel.

13. In combination with the mounting means of claim 12, a partition member fittable over said second sleeve and adapted to be inserted between said supply reel and said takeup reel, said partition member having an aperture through which said first shaft is passable, said partition member being mounted on an arm extending beyond the periphery of said reels, said arm being mounted on a third shaft parallel to said first shaft and positioned beyond the periphery of said reels so as to be slidable along the axis thereof, thus being movable along and off an end of said first shaft, and so as to be rotatable about the axis thereof, thus being swingable to one side to expose said first shaft.

14. In combination with the mounting means of claim 12, a partition member fittable over said second sleeve and adapted to be inserted between said supply reel and said takeup reel, said partition member having an aperture through which said second sleeve is passable, a friction element carried by said partition member at the aperfured portion thereof and comprising an annular head engageable with said friction element and fingers projecting from said head toward said supply reel for grasping the latter, said head and fingers being fittable over said second sleeve, and means for causing frictional engagement between said elements, said partition member being mounted on an arm extending beyond the peripheries of said reels and terminating in a sleeve having an inbent lower edge, a stud parallel to said second sleeve and mounted in said casing beyond the periphery of said reels, said sleeve being loosely received over said stud so as to be slidable along the axis thereof, thus being movable along and off an end of said second sleeve, and so as to be rotatable about the axis thereof, thus being swingable to one side to expose said second sleeve, and a stop element on said stud and engageable with said inbent lower sleeve edge, thus acting as a positive stop to prevent said sleeve from being accidentally withdrawn from said stud.

15. A film magazine comprising a casing, a shaft on which both a supply reel and a takeup reel are coaxially mounted, said reels having central apertures through which said shaft is passable, and a partition member fittable over said shaft and adapted to be inserted between said supply reel and said takeup reel, said partition member having an aperture through which said first shaft is passable, and a reel-grasping element frictionally carried by said partition member, projecting from said partition member in the direction of said supply reel, and engageable with said supply reel.

16. The film magazine of claim 15, said reel grasping element being frictionally carried by said partition member at the aperfured portion thereof and comprising an annular head engageable with said partition member and fingers projecting from said head toward said supply reel for grasping the latter, said head and fingers being fittable over said shaft.

17. The film magazine of claim 15, in which said partition member is mounted on an arm extending beyond the periphery of said reels, said arm being mounted on an axis member parallel to said shaft and positioned beyond the peripheries of said reels so as to be slidable therealong, thus being movable along and off an end of said shaft, and so as to be rotatable thereabout, thus being swingable to one side to expose said shaft.

18. The film magazine of claim 15, in which said partition member is mounted on an arm extending beyond the periphery of said reels and terminating in a sleeve having an inbent lower edge, an axis member parallel to said shaft and mounted in said casing beyond the periphery of said reels, said sleeve being loosely received over said axis member so as to be slidable therealong, thus being movable along and off an end of said shaft, and so as to be rotatable thereabout, thus being swingable to one side to expose said shaft, and a stop element on said axis member and engageable with said inbent lower sleeve edge when said sleeve is lifted, thus acting as a positive stop to prevent said sleeve from being withdrawn completely from said axis member.

19. In the film magazine of claim 15, said reel-grasping element being frictionally carried by and projecting from said partition member in the direction of said supply reel, said partition member being mounted on an arm extending beyond the peripheries of said reels, said arm being mounted on an axis member parallel to said shaft and positioned beyond the peripheries of said reels so as to be slidable therealong, thus being movable along and off an end of said shaft, and so as to be rotatable thereabout, thus being swingable to one side to expose said shaft.

20. In the film magazine of claim 15, said reel-grasping element being frictionally carried by said partition member at the apertured portion thereof and comprising an annular head engageable with said partition member and fingers projecting from said head toward said supply reel for grasping the latter, said head and fingers being fittable over said shaft, said partition member being mounted on an arm extending beyond the periphery of said reels and terminating in a sleeve having an inbent lower edge, an axis member parallel to said shaft mounted in said casing beyond the periphery of said reels, said sleeve being loosely received over said axis member so as to be slidable thereover, thus being movable along and off an end of said shaft, and so as to be rotatable thereabout, thus being swingable to one side to expose said shaft, and a stop element on said axis member and engageable with said inbent lower sleeve edge when said sleeve is lifted, thus acting as a positive stop to prevent said sleeve from being withdrawn completely from said axis member.

21. A film magazine comprising a casing, a shaft on which both a supply reel and a takeup reel are coaxially mounted, said reels having central apertures through which said shaft is passable, said shaft comprising a fixed stud, an inner rotating member rotatably received over said stud and comprising a sleeve receivable over said stud and a lower reel-supporting flange having a depression in the upper surface thereof, said stud extending above said inner member sleeve, an anti-friction bearing at the lower end of said stud, a spring active between the upper end of said stud and said inner member sleeve so as to urge said inner member toward said bearing, an outer rotating member comprising a second sleeve having a longitudinal slot therein receivable over the sleeve of said inner rotating member and having a laterally projecting lip at the lower end thereof extending beyond the central aperture of said lowermost reel, said lip being receivable in said depression in the flange of said inner rotating member, and a pin carried by said inner rotating member, whereby said members are simultaneously rotated, said outer member is slidable along said inner member, and lifting of said outer member along said inner member will lift the lowermost reel.

22. A film magazine comprising a casing, a shaft on which both a supply reel and a takeup reel are coaxially mounted, said reels having central apertures through which said shaft is passable, a partition member fittable over said shaft and adapted to be inserted between said supply reel and said takeup reel, said partition member having an aperture through which said first shaft is passable, a reel-grasping element frictionally carried and projecting from said partition member in the direction of said supply reel, said first shaft comprising an inner rotating member, a sleeve received thereover and having a slot therein parallel to its axis, a pin secured to said inner rotating member and passing through said slot, said sleeve thus being rotatable with said inner member and slidable therealong, and a laterally projecting lip at the lower end of said sleeve extending beyond the central aperture of said lowermost reel, whereby lifting of said sleeve along said inner member will lift the lowermost reel.

23. A film magazine comprising a casing, a shaft on which both a supply reel and a takeup reel are coaxially mounted, said reels having central apertures through which said shaft is passable, a partition member fittable over said shaft and adapted to be inserted between said supply reel and said takeup reel, said partition member having an aperture through which said shaft is passable, said partition member being mounted on an arm extending beyond the periphery of said reel, said arm being mounted on an axis member parallel to said shaft and positioned beyond the peripheries of said reels so as to be slidable therealong, thus being movable along and off an end of said shaft, and so as to be rotatable thereabout, thus being swingable to one side to expose said shaft, said shaft comprising an inner rotating member, a sleeve received thereover and having a slot therein parallel to its axis, a pin secured to said inner rotating member and passing through said slot, said sleeve thus being rotatable with said inner member and slidable therealong, and a laterally projecting lip at the lower end of said sleeve extending beyond the central aperture of said lowermost reel, whereby lifting of said sleeve along said inner member will lift the lowermost reel.

24. A film magazine comprising a casing, a shaft on which both a supply reel and a takeup reel are coaxially mounted, said reels having central apertures through which said shaft is passable, a partition member fittable over said shaft and adapted to be inserted between said supply reel and said takeup reel, said partition member having an aperture through which said shaft is passable, a reel-grasping element frictionally carried by said partition member at the apertured portion thereof and comprising an annular head engageable with said partition member and fingers projecting from said head toward said supply reel for grasping the latter, said head and fingers being fittable over said shaft, said shaft comprising a fixed stud, an inner rotating member rotatably received over said stud and comprising a sleeve receivable over said stud and a lower reel-supporting flange having a depression on the upper surface thereof, said stud extending above said inner member sleeve, an anti-friction bearing at the lower end of said stud, a spring active between the upper end of said stud and said inner member sleeve so as to urge said inner member toward said bearing, an outer rotating member comprising a second sleeve having a longitudinal slot therein receivable over the sleeve of said inner rotating member and having a laterally projecting lip at the lower end thereof, said lip extending beyond the central aperture of said lowermost reel and being received in said depression in the flange of said inner rotating member, and a pin carried by said inner rotating member and receivable within said slot in said outer rotating member, whereby said members are simultaneously rotated, said outer member is slidable along said inner member, and lifting of said outer member along said inner member will lift the lowermost reel.

25. A film magazine comprising a casing, a shaft on which both a supply reel and a takeup reel are coaxially mounted, said reels having central apertures through which said shaft is passable, a partition member fittable over said shaft and adapted to be inserted between said supply reel and said takeup reel, said partition member having an aperture through which said shaft is passable, said partition member being mounted on an arm extending beyond the periphery of said reels and terminating in a sleeve having an inbent lower edge, an axis member parallel to said shaft mounted in said casing beyond the periphery of said reels, said sleeve being loosely received over said axis member so as to be slidable therealong, thus being movable along and off an end of said shaft, and so as to be rotatable thereabout, thus being swingable to one side to expose said shaft, and a stop element on said axis member and engageable with said inbent lower sleeve edge, thus acting as a positive stop to prevent said sleeve from being withdrawn completely from said axis member, said shaft comprising a fixed stud, an inner rotating member rotatably received over said stud and comprising a sleeve receivable over said stud and a lower reel-supporting flange having a depression on the upper surface thereof, said stud extending above said inner member sleeve, an anti-friction bearing at the lower end of said stud, a spring active between the upper end of said stud and said inner member sleeve so as to urge said inner member toward said bearing, an outer rotating member comprising a second sleeve having a longitudinal slot therein receivable over the sleeve of said inner rotating member and having a laterally projecting lip at the lower end thereof and extending beyond the central aperture of said lowermost reel, said lip being receivable in said depression in the flange of said inner rotating member, and a pin carried by said inner rotating member, whereby said members are simultaneously rotated, said outer member is slidable along said inner member, and lifting of said outer member along said inner member will lift the lowermost reel.

26. A film magazine comprising a casing, a first shaft on which both a supply reel and a takeup reel are coaxially mounted, said reels having central apertures through which said first shaft is passable, a second shaft parallel to said first shaft and spaced therefrom beyond the periphery of said reels, a pair of sprocket wheels mounted on said second shaft, and means operatively connecting both of said sprocket wheels and said takeup reel for simultaneous rotation, a partition member fittable over said first shaft and adapted to be inserted between said supply reel and said takeup reel, said partition member having an aperture through which said first shaft is passable, and means for moving said partition member along said shaft for causing the reel positioned thereabove to move along said shaft independently of the reel therebelow.

27. In the film magazine of claim 26, a reel-grasping element frictionally carried by and projecting from said partition member in the direction of said supply reel.

28. In the film magazine of claim 26, a reel-grasping element frictionally carried by said partition member at the apertured portion thereof and comprising an annular head engageable with said partition member and fingers projecting from said head toward said supply reel for grasping the latter, said head and fingers being fittable over said first shaft.

References Cited in the file of this patent

UNITED STATES PATENTS

| | | |
|---|---|---|
| 1,234,545 | Jenkins | July 24, 1917 |
| 1,481,086 | Fitz | Jan. 15, 1924 |
| 1,548,960 | Stuber et al. | Aug. 11, 1925 |
| 1,568,067 | Howell | Jan. 5, 1926 |
| 1,713,277 | Goldberg et al. | May 14, 1929 |
| 2,213,777 | Wittel | Sept. 3, 1940 |
| 2,241,232 | Wittel | May 6, 1941 |
| 2,349,018 | Tasker | May 16, 1944 |
| 2,398,879 | Bouget | Apr. 23, 1946 |
| 2,561,503 | D'Ornellas | July 24, 1951 |
| 2,633,305 | Kaylor | Mar. 31, 1953 |

FOREIGN PATENTS

| | | |
|---|---|---|
| 334,086 | Germany | Apr. 28, 1921 |
| 456,660 | Germany | Feb. 29, 1928 |